United States Patent [19]

Biermann et al.

[11] 4,325,739

[45] Apr. 20, 1982

[54] MAGNETIC METAL AND ALLOY PIGMENTS

[75] Inventors: Hans-Peter Biermann, Krefeld; Helmut Steinberger, Leverkusen; Artur Botta, Krefeld; Rolf Naumann, Krefeld; Lutz Leitner, Krefeld; Heinrich Heine, Krefeld, all of Fed. Rep. of Germany

[73] Assignee: Bayer Aktiengesellschaft, Leverkusen, Fed. Rep. of Germany

[21] Appl. No.: 204,682

[22] Filed: Nov. 5, 1980

[30] Foreign Application Priority Data

Nov. 13, 1979 [DE] Fed. Rep. of Germany ....... 2945687
Jul. 22, 1980 [DE] Fed. Rep. of Germany ....... 3027757

[51] Int. Cl.[3] .......................... C04B 31/28; B22F 1/02

[52] U.S. Cl. .................................... 106/290; 106/304; 106/308 Q; 106/309; 252/62.55

[58] Field of Search ............... 106/290, 308 B, 308 Q, 106/304, 309; 252/62.55, 62.56; 75/0.5 BA; 148/105; 428/327, 328, 329

[56] References Cited

U.S. PATENT DOCUMENTS

| | | | |
|---|---|---|---|
| 2,744,040 | 5/1956 | Altmann | 252/62.55 |
| 3,520,676 | 7/1970 | Stahr | 148/105 |
| 4,014,710 | 3/1977 | Woditsch et al. | 106/308 Q |
| 4,043,846 | 8/1977 | Amemiya et al. | 252/62.55 |
| 4,073,977 | 2/1978 | Koester et al. | 106/308 Q |
| 4,075,384 | 2/1978 | Suzuki et al. | 106/290 X |
| 4,076,890 | 2/1978 | Yamada et al. | 428/327 X |
| 4,167,582 | 9/1979 | Takahashi et al. | 428/328 |

*Primary Examiner*—Carl F. Dees
*Attorney, Agent, or Firm*—Sprung, Felfe, Horn, Lynch & Kramer

[57] ABSTRACT

A pigment of a magnetic metal or alloy thereof carrying, in about 0.2 to 30% of the weight of the metal or alloy, a coating of at least one member selected from the group consisting of an ortho-silicic acid ester, a hydrolyzate thereof and a condensation product thereof. Optionally it also carries a corrosion inhibitor. The coated pigment is produced by suspension of the untreated pigment in a liquid medium containing the ortho-silicic acid ester or derivative thereof, and optionally the corrosion inhibitor, followed by separation and drying at 50° to 250° C. The resulting pigment is non-pyrophoric and of high performance properties suitable for use in magnetic recording media.

9 Claims, No Drawings

MAGNETIC METAL AND ALLOY PIGMENTS

This invention relates to non-pyrophoric magnetic metal and alloy pigments containing a material based on silicic acid esters on their surfaces, a process for the preparation of these pigments and their use for the preparation of magnetic recording media.

The constantly increasing demand for ever higher quality materials for magnetic recording has in recent years led to the development of magnetic metal and alloy pigments, mainly based on iron, cobalt and/or nickel. These differ from conventional iron oxide and chromium dioxide pigments by the considerably greater energy products (B×H-value) and enable magnetogram carriers of superior storage density to be obtained while at the same time reducing the quantity of magnetically active material required.

One of the reasons that these pigments have hitherto not been successful on the market is their high chemical reactivity. Metal particles of the size of pigments have such a high affinity for oxygen that they spontaneously flare up and are converted into metal oxides if suddenly exposed to air at room temperature (see Römpps Chemie-Lexikon, 7th Edition, Franckh'sche Verlagshandlung, Stuttgart 1975, page 2852). In other words, they are pyrophoric and must therefore always be handled, transported and processed under inert conditions.

There has been no lack of attempts in the past to provide suitable measures to avoid this serious disadvantage. It is known that the pyrophoric character of the metal partices can be destroyed by a surfacial oxidation, but a considerable proportion of the magnetically high grade metal particle is thereby converted into a magnetically inferior oxide, which results in a loss in the saturation magnetization and the remanence.

Attempts have also been made to protect metal particles against atmospheric oxidation by treating them with polymeric organic binders to form so-called masterbatches. Although this measure prevents the loss of metallic substance mentioned above, it requires the use of large quantities of polymer if a satisfactory environmental stability is to be achieved. The higher the polymer content in the masterbatch the more problems there are in its use for the preparation of a magnetic recording medium which is highly filled with pigments. Furthermore, the polymer used for stabilization may give rise to incompatibilities when the master batch is subsequently processed with binders of a different chemical nature. A pigment which has been protected in this manner is therefore limited in its application.

The various known protective measures also include the treatment of metal powder with compounds which form polymers so that polymer layers are produced on the metal particles.

The use of silane coupling agents with magnetic pigments is also known. In U.S. Pat. No. 4 076 890, for example, it has been disclosed for improving the strength of magnetisable layers and in Japanese Specification No. 51-104 594 it is used for improving the stability and dispersibility of magnetic metal pigments in binders. Pigments which have been treated with silane coupling agents, however, cannot be incorporated equally well in all binder systems.

It was an object of the present invention to provide non-pyrophoric magnetic metal and alloy pigments for recording purposes which would not have the disadvantages mentioned above.

When working on this problem, it was surprisingly found that magnetic metal and alloy pigments coated with at least one ortho silicic acid ester and/or its hydrolyzates and/or condensates in a quantity of about 0.2 to 30% by weight, preferably about 1 to 20% by weight and most preferably about 2 to 15% by weight, are protected against the attack of atmospheric oxygen and moisture.

It was also found that this protective surface layer may contain corrosion inhibitors which increase the resistance of the pigments even further.

Metal particles protected in this manner are very readily dispersed and no problems of compatibility with commercial binders occur.

The present invention also provides a process for the preparation of these pigments.

Pyrophoric magnetic metal and alloy powders which can be protected against atmospheric oxygen and moisture in accordance with the teaching of the present invention have been described in the literature. They consist mainly of iron, cobalt and nickel or alloys formed from a combination of these ferromagnetic metals. They may contain about 0.1 to 10% by weight of one or more foreign elements such as, for example, cadmium, lead, calcium, zinc, magnesium, aluminum chromium, tungsten, phosphorus or boron. The pyrophoric metal and alloy pigments may also contain small quantities of water, oxides or oxide-hydroxides. They may be prepared from the corresponding salt solutions by electrolytic deposition on a mercury cathode, by decomposition of the corresponding metal carbonyls, by reduction of the corresponding metal ions from their solutions with the aid of dissolved reducing agents such as boranate, hypophosphite, etc. or by reduction with gaseous reducing agents (normally hydrogen) from the corresponding oxides, oxide-hydroxides, oxalates, formates, etc., at temperatures above 250° C., or by one of the less usual processes mentioned in the literature. The particles may be isometric or anisometric and may be substantially homogeneous in structure or subdivided to a varyng extent into individual metal nuclei adhering together. Metal powders composed of needle-shaped individual particles having on average not more than five pores and consisting on average of not more than two metal nuclei are preferred on account of their superior properties as recordng carriers. Pyrophoric metal powders of this type have been described in German Patent Application No. 29 09 480.

Silicic acid esters which extert the protective function according to the invention are in particular compounds corresponding to the following general formula:

$$(RO)_nSi(OR')_{4-n}$$

their hydrolyzates, including the partial hydrolyzates, and the condensates obtained from the hydrolyzates partial hydrolyzates, optionally with the cooperation of monomeric, unsaponified silicic acid esters.

In the above formula, R denotes an alkyl, cycloalkyl or alkenyl group with 1 to 20 carbon atoms, which may be branched and/or interrupted one or more times by oxygen bridges, or it may be an aryl or aralkyl group. The alkyl or alkenyl group may be linear although a hydrocarbon group which is branched at least once is preferred. Examples include the following groups: isopropyl, t-butyl, 3-methylbutyl, 2-ethylhexyl, octadecyl and oleyl. Examples of cycloalkyl groups include cyclopentyl, cyclohexyl or cycloheptyl. The aryl group may be a phenyl group, although an alkyl-substituted phenyl group (aralkyl group) is preferred, particularly if the one or more than one alkyl group is in the ortho-position to the ester bond. Examples for this include the o-tolyl, o,o'-xylyl and o,o'-diethylphenyl group. Examples of aralkyl groups also include the benzyl, 1-phenylethyl and 2-phenylethyl groups.

R' denotes an alkyl group having from 1 to 4 carbon atoms. The alkyl group R' may be branched but a linear, straight chain hydrocarbon group such as methyl or ethyl is preferred.

The symbol n represents a number from 0 to 4, preferably from 1 to 3.

Silicic acid esters of the type indicated above may be prepared by various methods known in the art, see W. Noll, Chemie und Technologie der Silikone, 2nd Edition, publishers Verlag Chemie, Weinheim 1968, page 554 et seq. For the purpose according to the invention, it is preferred to employ methods of preparation which enable the esters to be obtained completely free from acid impurities (particularly hydrogen halides) without undue effort, since these impurities, as is known, are likely to cause corrosion of the metal.

In accordance with the present invention, the surface of the metal particles may be covered with only one ester, its hydrolyzate and/or a condensate thereof, but the surface layer may also be formed from two or more silicic acid esters, their hydrolyzates or cohydrolyzates and/or condensates or co-condensates. It is therefore not absolutely necessary for the silicic acid esters used according to the invention to be uniform compounds; on the contrary, any reaction mixtures obtained from the process of preparation may well be used directly for stabilization, so that difficult and expensive methods of purification may be dispensed with.

In place of the monomeric ortho silicic acid esters, their reaction products can be used from the outset with amounts of water insufficient for complete hydrolysis to coat the metal particles.

Incomplete hydrolysis yields polysilicic acid esters which may be described by the following formulas, for example:

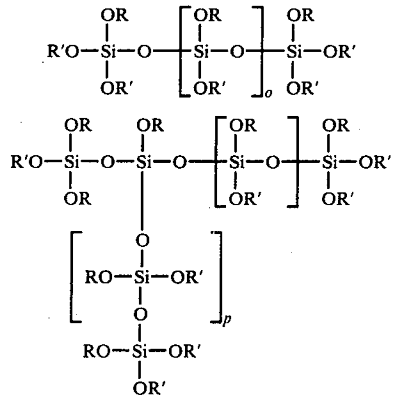

wherein R may signify an alkyl, cycloalkyl or alkenyl radical with 1 to 20 carbon atoms, possibly branched and/or interrupted once or repeatedly by oxygen bridges, or an aryl or aralkyl radical, or a hydrogen atom. R' stands for an alkyl group having from 1 to 4 carbon atoms or is possibly the same as R, o and p being numbers from 0 to 50, and preferably from 1 to 35.

The minimum quantity of silicic acid ester required to destroy the pyrophoric character of the metal particles depends upon the size of the particles, their specific surface area (BET nitrogen adsorption method) and the porosity of the pigments. The degree of reduction of the pigments is also significant: materials containing small quantities of oxides or oxide-hydroxides can be stabilized with smaller quantities, for a comparable particle size, BET surface and pore content, than completely reduced metal powders. The minimum quantity can readily be determined by one skilled in the art by a simple test. Since, however, it is in most cases required not only to destroy the pyrophoric character of the metal particles but also to preserve the magnetic characteristics of the particles when stored in air over prolonged periods, the treatment would in any case be carried out with a slightly greater than the minimum quantity of silicic acid ester required, particularly since the protective surface layer has no deleterious effect on subsequent processing.

The magnetic metal and alloy pigments claimed according to the invention therefore contain on their surfaces at least one ortho silicic acid ester of the type indicated above, its hydrolyzate and/or its condensate in a quantity of from 0.2 to 30% by weight, preferably from 1 to 20% by weight and most preferably from 2 to 15% by weight. Although the magnetic metal and alloy pigments of the present invention have a remarkable resistance to electrochemical corrosion processes even when the pigments are finally embedded in commercial binders of magnetic recording medium, a still higher resistance may be desired for certain purposes.

It was found that this was achieved in magnetic metal and alloy pigments which contain one or more corrosion inhibitors in addition to the silicic acid ester coating. Metal powders treated in this manner show a greater stability to atmospheric oxygen in atmospheres of varying relative humidities.

The corrosion inhibitors used may be the compounds available and known to be effective in the art, e.g. higher amines, aldehydes, alcohols or ketones, amidines, guanidines, heterocyclic compounds containing nitrogen and/or oxygen and/or sulphur as hetero atoms (urotropine, pyrazoles, imidazoles, imidazolines, oxazoles, isoxazoles, thiazoles, isothiazoles, triazoles, triazines, pyridines and the corresponding benzene-condensed systems such as benzimidazoles, benzothiazoles, benzotriazoles, quinolines or isoquinolines, quinazolines and the like), sulphurnitrogen compounds, organic acetylene derivatives, organic nitro compounds, phosphonic acids and phosphonocarboxylic acids and their derivatives and salts, nitrogen-containing phosphonic or phosphonocarboxylic acids and their derivatives and salts, organic and inorganic salts of carboxylic acids, such as acetates, benzoates, cinnamates, salicylates and other organic and inorganic phosphates (polyphosphates), phosphites and sulphonates, etc. Suitable mixtures of these compounds may, of course, also be used.

Magnetic metal and alloy pigments in which the corrosion inhibitors in the silicic acid ester layer are compounds from the series of benzotriazoles, benzothiazoles, benzimidazoles, guanidines, amidines and/or metal salts of carboxylic acids and are present in a quantity of about 0.01 to 5% by weight, preferably about 0.1 to 4% by weight and most preferably about 0.5 to 3% by weight, based on the metal, are particularly preferred.

The stabilizing protective layer may be applied to the pyrophoric magnetic metal and alloy pigments by treating the pigments in suitable apparatuses (fluidized bed reactor, rotary tube, etc.) with the silicic acid esters which have previously been converted into a finely divided state by evaporation or atomization. The process may be assisted by the action of steam and/or catalytically active substances and may, if necessary, be carried out at temperatures above room temperature.

Stabilization is, however, preferably carried out in the liquid phase by treating the untreated pigments in suspensions in organic and/or aqueous media with at least one ortho-silicic acid ester and/or polysilicic acid ester and optionally at least one corrosion inhibitor and they removing the organic and/or aqueous phase and drying at temperatures of about 50° to 250° C.

Suitable organic media include lower alcohols such as methanol, ethanol or isopropanol, lower ketones such as acetone or butanone-(2) and lower ethers such as tetrahydrofuran or 1,4-dioxane. Since the magnetic metal and alloy pigments are self-igniting before they have been stabilized and are converted into a thermodynamically metastable state by the treatment, the treatment should for safety reasons be carried out in organic-/aqueous media or in water. Auxiliary agents which facilitate dispersion of the pigments (dispersing agents) and/or promote hydrolysis or condensation of the ester may be added if desired. Examples of such auxiliary agents include condensed phosphates, cationic, anionic, amphoteric or nonionic wetting agents or surface-active agents, substances or mixtures of substances, in either a free or an immobilized form, which are acid or alkaline in their action, and pH stabilizing substances such as buffer mixtures.

The pyrophoric magnetic metal or alloy pigment is suspended in the organic and/or aqueous medium by conventional methods. Silicic acid esters and optionally corrosion inhibitors may be added to the liquid phase at any time before, during or after preparation of the suspension; in the latter case, they are preferably added immediately after the pigment has been suspended. The pigment content of the suspension is generally within the range of from 5 to 50% by weight.

It has in many cases been found advantageous to leave the pigment for some time in the suspension before it is separated and dried at temperatures of from 50° to 250° C., preferably about 80° to 150° C. During this time interval, which is preferably about ½ hour to 5 hours, the suspension is stirred at room temperature or at higher temperatures, in particular about 20° to 90° C.

It is particularly preferred to combine the separation of the treated magnetic metal and alloy pigments from the organic and/or aqueous medium with the drying of the pigments by spray-drying the suspension. The temperature of the drying gas used for this operation may be up to about 500° C. The spray-dried coated pigments may be subjected to an additional heat treatment at the temperatures indicated above and are optionally transferred from an inert gas atmosphere into an atmosphere containing oxygen.

The process according to the invention is normally carried out with as far as possible complete exclusion of oxygen in an inert gas atmosphere (the term "inert gas atmosphere" also includes a vacuum), generally nitrogen, in order to prevent oxidation of the magnetic metal and alloy pigments. The coated pigment is only brought into the air when drying and tempering have been completed. If desired, measured quantities of oxygen or air may be added so that the inert gas atmosphere is gradually replaced by air. It is thereby possible to ensure that any active centers still present, which would oxidize immediately on direct access of air and might act as an initial source of ignition for the whole quantity of pigment due to the energy thereby liberated, are safely inactivated. This inactivation may, of course, also be achieved with oxygen-gas mixtures other than air.

It should be pointed out that it is highly surprising, even for one skilled in the art, to find that in spite of the use of protic media, the process described is successful without the magnetic metal and alloy pigments being deleteriously affected. The saturation magnetization decreases by at most a percentage equal to the percentage by weight of the non-magnetic protective envelope in the pigment claimed according to the invention. The apparently steeper decrease in remanent magnetization which was observed in some samples of powder is due to the effects of texture and packing and is not reflected by the remanence of the tapes.

The non-pyrophoric magnetic metal and alloy pigments according to the invention can be made up into dispersions of the pigments in binders and solvents in conventional manner, and these may then be used for the preparation of the magnetic recording media proper. Their excellent dispersion properties both in organic and in aqueous systems are striking. No incompatibilities could be observed. On the contrary, it was unexpectedly found that when preparing the dispersions, the quantity of binder used could without disadvantage be reduced by a proportion corresponding to the proportion by weight of stabilizing protective layer on the pigments. This is an advantage which is not to be underestimated, particularly when high degrees of pigment filling are required.

The usual binders known in the art for the manufacture of magnetogram carriers are in principle also suitable for use in combination with the magnetic metal and alloy pigments according to the invention. Examples of these binders include copolymers of vinyl chloride with vinyl acetate, including those containing carboxyl, hydroxyl or epoxide groups, copolymers of vinyl chloride and acrylic or methacrylic acid esters, including the hydroxyl group-containing derivatives which are obtainable by partial saponification, copolymers of vinyl chloride with unsaturated monomers containing hydroxyl groups, with acrylonitrile or with vinylidene chloride, copolymers of acrylic acid esters with acrylonitrile, with vinylidene chloride or with styrene, and the analogous copolymers of methacrylic acid esters, copolymers of vinylidene chloride or butadiene with acrylonitrile, polyvinyl fluorides, polyvinyl acetals such as polyvinyl formals or polyvinyl butyrals, polyurethane elastomers, polyamide resins, polyester resins, binders based on cellulose, binders based on synthetic rubbers, unsaturated polyester resins, phenoplasts, aminoplasts, epoxide resins in combination with hardeners, reactive modified alkyd resins, polyethers modified with isocyanate groups, and binders based on polyurethane prepolymers containing reactive isocyanate groups. Any suitable mixtures of these binders may, of course, also be used.

Additives of the type normally used in the production of magnetic recording media may be added at a suitable stage in the preparation of the pigment dispersions. Examples of such additives are dispersing agents, lubricants, plasticizers, fungicides, age stabilizers, antistatic agents and non-magnetizable fillers or pigments.

Magnetic metal and alloy pigments according to the present invention may be used for the manufacture of all types of magnetic recording media such as, for example, audio tapes, video tapes, instrumentation tapes, computer tapes, flexible and rigid magnetic cards, flexible magnetic discs, rigid magnetic plates and drum storages.

Magnetic information carriers of these types are used for the recording of images and sound, for the storage of measuring data, as external storages for data processing plants, for archive purposes, for text processing systems and for identification systems such as passes, credit cards and travel tickets.

The invention will now be described in detail with the aid of examples which illustrate but in no way limit the subject of the application. The magnetic data given in the examples were measured in a field of 3.5 KOe.

EXAMPLE 1

20 g of a needle-shaped pyrophoric metal pigment consisting substantially of iron ($I^{H}C$: 772 Oe, Br/$\rho$: 1102 $Gg^{-1}cm^3$, $4\pi I_S/\rho$: 1855 $Gg^{-1}cm^3$, $Br4\pi I_s$: 0.59) were dispersed in 200 g of distilled water with the aid of a mixing siren. 4 g of tetraethylsilicate were added during this process. The suspension was filtered and the filter cake was dried in a stream of nitrogen at 105° C. for 10 hours. After cooling, a sample was exposed air and pulverized. The magnetic powder data of this sample were measured, (A) immediately and (B) after 10 days' storage in air in a thin layer at 25° C. and 65% relative humidity.

| | A | B |
|---|---|---|
| $I^{H}c$ (Oe) | 759 | 765 |
| Br/$\rho$ (G $g^{-1}$ $cm^3$) | 990 | 935 |
| $4\pi$ $I_s/\rho$ (G $g^{-1}$ $cm^3$) | 1710 | 1614 |
| Br/$4\pi$ $I_s$ | 0.58 | 0.58 |

EXAMPLE 2

3.7 g of the reaction product of 1 mole of tetraethylsilicate and 1 mole of n-octadecanol obtained after removing the light boiling fraction (final pressure, 20 mbar; sump temperature, up to 95° C.) were dissolved in a mixture of 120 g of butanone-(2) and 30 g of distilled water. 15 g of a needle-shaped pyrophoric metal pigment consisting substantially of iron ($I^{H}c$: 1126 Oe, Br/$\rho$: 1233 $Gg^{-1}cm^3$, $4\pi I_s/\rho$: 1950 $Gg^{-1}cm^3$, Br/$4\pi I_s$: 0.63) were dispersed in this solution by means of a dissolver. After the resulting suspension had been stirred at 65° C. for 75 minutes, the solvent and products of ester hydrolysis and cndensation were evaporated in a rotary evaporator at a final pressure of 30 mbar and at temperatures of up to 80° C. The granular material was heat-treated at 90° C. under an inert gas for one hour. A sample of the product when cold was triturated in air. The magnetic powder data determined on this sample, (A) immediately and (B) after 10 days' storage in air in a thin layer at 25° C. and 65% relative humidity, were as follows:

| | A | B |
|---|---|---|
| $I^{H}c$ (Oe) | 1115 | 1121 |
| Br/$\rho$ (G $g^{-1}$ $cm^3$) | 1043 | 1020 |
| $4\pi$ $I_s/\rho$ (G $g^{-1}$ $cm^3$) | 1658 | 1619 |

-continued

| | A | B |
|---|---|---|
| Br/$4\pi$ $I_s$ | 0.63 | 0.63 |

EXAMPLE 3

3 a 10.4 g of 2-ethylhexyloxy-triethoxysilane were dissolved in a mixture of 315 g of ethanol and 135 g of distilled water. The pH was adjusted to 4.5 by the addition of acetic acid and the solution was stirred at room temperature for one hour. 50 g of a pyrophoric iron pigment ($I^{H}c$: 714 Oe, Br/$\rho$: 973 $Gg^{-1}cm^3$, $4\pi I_s/\rho$: 1864 $Gg^{-1}cm^3$, Br/$4\pi I_s$: 0.52) were then dispersed in this solution by means of a dissolver. The pigment suspension was stirred for one hour at 50° C. and then fed into a laboratory spray dryer (IRA mini-spray drying-installation HO) which was operated with nitrogen (drying gas temperature from 180° to 200° C.). The spray-dried pigment was tempered at 100° C. for one hour under nitrogen before a sample of the finely divided material was brought into air. The magnetic powder data of these sample were determined immediately (A), after 10 days' storage in air in a thin layer at 25° C. and 65% (B) respectively 95% (C) relative humidity:

| | A | B | C |
|---|---|---|---|
| $I^{H}c$ (Oe) | 769 | 775 | 780 |
| Br/$\rho$ (G $g^{-1}cm^3$) | 810 | 8Q5 | 738 |
| $4\pi$ $I_s/\rho$ ($Gg^{-1}cm^3$) | 1687 | 1665 | 1538 |
| Br/$4\pi$ $I_s$ | 0.48 | 0.48 | 0.48 |

3 b 8.6 g of 2-ethylhexyloxi-triethoxysilane were dissolved in a mixture of 160 g of ethanol and 65 g of distilled water. The pH was adjusted to 4.5 by the addition of acetic acid and the solution was stirred at room temperature for one hour. A suspension of 50 g of the same pyrophoric iron pigment as in Example 3 a was meanwhile prepared in a mixture of 155 g of ethanol and 70 g of distilled water in which 1 g of 1,2-pentamethylenebenzimidazole had previously been dissolved. This suspension was diluted with the silane solution, using a high speed stirrer, and the subsequent procedure was the same as in Example 3 a. The magnetic powder data were determined as described in Example 3 a and the following results were obtained:

| | A | B | C |
|---|---|---|---|
| $I^{H}c$ (Oe) | 771 | 770 | 773 |
| Br/$\rho$ ($Gg^{-1}cm^3$) | 798 | 800 | 758 |
| $4\pi$ $I_s/\rho$ ($Gg^{-1}cm^3$) | 1695 | 1667 | 1610 |
| Br/$4\pi$ $I_s$ | 0.47 | 0.48 | 0.47 |

3 c 8.6 g of 2-ethylhexyloxy-triethylhoxysilane and 1 g of Preventol (Trade Mark)CI 6 (ethoxylated 2-mercaptobenzimidazole, Bayer AG) were dissolved in a mixture of 315 g of ethanol and 135 g of distilled water. After the solution had been stirred at room temperature for one hour, 50 g of the same pyrophoric iron pigment as in Example 3 a were suspended therein. The subsequent procedure was the same as in Example 3 a. The results obtained from measuring the magnetic powder data of the stabilized pigment were as follows:

| | A | B | C |
|---|---|---|---|
| $I^{H}c$ (Oe) | 759 | 759 | 763 |
| $Br/\rho$ ($Gg^{-1}cm^3$) | 805 | 805 | 773 |
| $4\pi\ I_s/\rho$ ($Gg^{-1}cm^3$) | 1678 | 1660 | 1621 |
| $Br/4\pi\ I_s$ | 0.48 | 0.48 | 0.48 |

3 d 8.6 g of 2-ethylhexyloxy-triethoxysilane and 1 g of 1-hydroxybenzotriazole were dissolved in a mixture of 315 g of ethanol and 135 g of distilled water. 50 g of the same pyrophoric iron pigment as in Example 3 a were suspended in this solution. The subsequent procedure was the same as in Example 3 a except that the suspension was spray-dried immediately after it had been prepared. The results obtained from measuring the magnetic powder data of the stabilized pigment were as follows:

| | A | B | C |
|---|---|---|---|
| $I^{H}c$ (Oe) | 775 | 771 | 768 |
| $Br/\rho$ ($G\ g^{-1}cm^3$) | 778 | 775 | 750 |
| $4\pi\ I_s/\rho$ ($G\ g^{-1}cm^3$) | 1621 | 1614 | 1546 |
| $Br/4\pi\ I_s$ | 0.48 | 0.48 | 0.49 |

3 e

The procedure was the same as in Example 3 c except that 1 g of cyclohexylimino-carbonic acid dimorpholide was used instead of 1 g of Preventol CI 6 Trade Mark.) The results obtained from measurements of the magnetic powder data of the stabilized pigment were as follows:

| | A | B | C |
|---|---|---|---|
| $I^{H}c$ (Oe) | 755 | 758 | 760 |
| $Br/\rho$ ($Gg^{-1}cm^3$) | 814 | 815 | 810 |
| $4\pi\ I_s/\rho$ ($Gg^{-1}cm^3$) | 1696 | 1685 | 1676 |
| $Br/4\pi\ I_s$ | 0.48 | 0.48 | 0.48 |

3 f

The procedure was the same as in Example 3 b except that 1 g of isophoronediamine-bis-caprolactam amidine was used instead of 1 g of 1,2-pentamethylene benzimidazole. The results obtained from measurements of the magnetic powder data of the stabilized pigment were as follows:

| | A | B | C |
|---|---|---|---|
| $I^{H}c$ (Oe) | 765 | 759 | 760 |
| $Br/\rho$ ($Gg^{-1}cm^3$) | 804 | 795 | 802 |
| $4\pi\ I_s/\rho$ ($Gg^{-1}cm^3$) | 1677 | 1680 | 1670 |
| $Br/4\pi\ I_s$ | 0.48 | 0.47 | 0.48 |

To assess the corrosion resistance in the tape, short samples of tape were prepared by the following method, using both the stabilized pigments and, for comparison, the untreated pyrophoric iron pigment:

1 g of metal pigment was dispersed in 2.5 cc of a 12% by weight solution of a polyvinyl chloride/polyvinyl acetate copolymer in equal parts of ethyl acetate and butyl acetate which in addition contained 4% by weight (based on the pigment) of a dispersing agent, using a Muller-dispersing machine under a load of 6 kp at 175 revolutions. The sample of lacquer obtained was drawn out on a 30μ thick polyester foil, using a 90μ film drawing device, and then orientated in a magnetic field and dried.

In order to obtain more accurate information, several samples of tape were prepared from each sample of pigment, and each sample obtained was stored at room temperature for 48 hours. Samples of tape having a homogeneously smooth and closed surface were then put into a weathering chamber which was at a constant temperature of 55° C. and a relative humidity of 95%. The condition of the magnetic layer was assessed by viewing it in direct light under 35 times magnification. The results of the weathering test are summarized in the Table below.

| | first traces of rust after an average of x days weathering test |
|---|---|
| unstabilized pigment | 4 |
| Sample 3 a | 39 |
| Sample 3 b | 51 |
| Sample 3 c | 58 |
| Sample 3 d | 70 |
| Sample 3 e | 55 |
| Sample 3 f | 47 |

EXAMPLE 4

10 g of a needle-shaped pyrophoric metal pigment consisting substantially of iron ($I^{H}c$: 844 Oe, $Br/\rho$ 1182 $Gg^{-1}cm^3$, $4\pi I_s/\rho$: 1917 $Gg^{-1}cm^3$, $Br/4\pi I_s$: 0.62) were suspended in an emulsion of 1.9 g of dodecyloxytriethoxysilane in a mixture of 50 g of 1,4-dioxane and 30 g of distilled water, using a Kotthoff stirrer. The suspension was stirred for 3 hours at 40° C. It was then filtered and the filter cake was dried for 8 hours at 150° C. in a stream of nitrogen. A sample of the cooled product was brought into contact with air and crushed. The magnetic powder data of this sample were determined (A) immediately and (B) after 10 days' storage in air in a thin layer at 25° C. and 65% relative humidity:

| | A | B |
|---|---|---|
| $I^{H}c$ (Oe) | 840 | 844 |
| $Br/\rho$ ($Gg^{-1}cm^3$) | 1033 | 1027 |
| $4\pi\ I_s/\rho$ ($Gg^{-1}cm^3$) | 1693 | 1685 |
| $Br/4\pi\ I_s$ | 0.61 | 0.61 |

EXAMPLE 5

4.4 g of o-methylphenoxy-triethoxysilane were dissolved in a mixture of 80 g of isopropanol and 20 g of distilled water. The pH of the solution was adjusted to 9 with ammonia water. 15 g of a needle-shaped pyrophoric metal pigment consisting substantially of iron ($I^{H}c$: 1313 Oe, $Br/\rho$: 1137 $Gg^{-1}cm^3$, $4\pi I_s/\rho$: 1935 $Gg^{-1}cm^3$, $Br/4\pi I_s$: 0.59) were dispersed therein by means of a mixing siren. The pigment suspension was then stirred for one hour at 85° C. It was filtered and the filter cake was dried in a stream of nitrogen at 130° C. for 9 hours. After cooling, a sample was triturated in air. The magnetic powder data measured on this sample (A) immediately and (B) after 10 days' storage in air in a thin layer at 25° C. and 65% relative humidity, were as follows:

| | A | B |
|---|---|---|
| $I^{H}c$ (Oe) | 1292 | 1305 |
| $Br/\rho$ ($Gg^{-1}cm^3$) | 980 | 942 |
| $4\pi\ I_s/\rho$ ($Gg^{-1}cm^3$) | 1689 | 1611 |
| $Br/4\pi\ I_s$ | 0.58 | 0.58 |

EXAMPLE 6

285 g of a mixture of
- 25.7% by weight of tetraethylsilicate,
- 43.3% by weight of 2-ethylbutyloxy-triethoxysilane
- 22.9% by weight of bis-(2-ethylbutyloxy)-diethoxysilane,
- 6.8% by weight of tris-(2-ethylbutyloxy)-ethoxysilane,
- 0.9% by weight of ethanol and
- 0.4% by weight of 2-ethylbutanol were dissolved in a mixture of 6750 g of ethanol and 2250 g of distilled water. The pH of the solution was adjusted to 4.2 by the addition of acetic acid. After the solution has been stirred at room temperature for 90 minutes, 1000 g of a needle-shaped pyrophoric metal pigment consisting substantially of iron ($I^{H}c$: 1050 Oe, $Br/\rho$: 1182 $Gg^{-1}cm^3$, $4\pi I_s/\rho$: 1910 $Gg^{-1}cm^3$, $Br/4\pi I_s$: 0.62) were dispersed therein by means of a dissolver. The resulting suspension was stirred at 45° C. for 2 hours and then fed into a laboratory spray drier (IRA mini spray drying-gas installation HO) operated with nitrogen (drying gastemperature from 180° to 200° C.). The spray-dried pigment was tempered under nitrogen at 110° C. for 2 hours. When it was cold, a sample of the pulverulent product was brought into contact with air. The following magnetic values were determined on this sample, (A) immediately and (B) after 10 days' storage in a thin layer at 25° C. and 65% relative humidity:

| | A | B |
|---|---|---|
| $I^{H}c$ (Oe) | 1105 | 1114 |
| $Br/\rho$ ($Gg^{-1}cm^3$) | 968 | 930 |
| $4\pi\ I_s/\rho$ ($Gg^{-1}cm^3$) | 1699 | 1632 |
| $Br/4\pi\ I_s$ | 0.57 | 0.57 |

Production of magnetic tapes

(a) Physically drying binder system 236 g of the stabilized metal pigment were dispersed in a solution of 53 g of polyvinyl chloride/polyvinyl acetate copolymer, 4.5 g of silicone oil and 6 g of dispersing agent in 440 g of a mixture of equal parts of ethyl acetate and butyl acetate and ground in a pebble mill (grinding media: glass beads 1,2 and 3 mm in diameter) for 3.5 hours. The mixture was then filtered and the lacquer was applied to a polyester foil 12μ in thickness, and the iron pigment dispersed in the lacquer was orientated in a magnetic field. The magnetic layer was then dried. The thickness of the layer when dry was about 6μ.

Results of magnetic measurements on the tape:
$I^{H}c$ 1020 Oe (1002 Oe)
Br 3050 G (3150 G)
Br/Bs 0.78 (0.78)

The figures in brackets are the data of the corresponding tape obtained from unstabilized pigment. The two tapes have similar volume packing factors with respect to the magnetically active material.

(b) Cross-linking binder system 275 g of the stabilized metal pigment were dispersed in a solution of 14.4 g of polyvinyl chloride/polyvinyl acetate copolymer, 5 g of acrylonitrile/butadiene copolymer, 19.4 g of polyester urethane, 92.4 g of hydroxyl-containing polyacrylate and 8.5 g of dispersing agent in a mixture of 231 g of tetrahydrofuran, 115.5 g of methyl isobutyl ketone and 51.7 g of cyclohexanone. The mixture was then milled for 3.5 hours in a pebble mill (grinding media: glass beads 1,2 and 3 mm in diameter). 19.4 g of a polyfunctional aliphatic isocyanate were added 30 minutes before the end of the milling time in order to cross-link the binder system. The product was then filtered, the lacquer was applied to a polyester foil 12μ in thickness and the iron pigment dispersed in the lacquer was orientated in a magnetic field. The magnetic lacquer was then dried. Its thickness in the dry state was about 6μ.

Results of magnetic measurements on the tape:
$I^{H}c$: 1039 Oe
Br: 2700 G
Br/Bs: 0.76

(c) Aqueous physically drying binder system 240 g of the stabilized metal pigment were suspended in 176 g of distilled water containing 8% by weight (based on the pigment) of a dispersing agent. A mixture of 200 g of a 50% dispersion of an acrylate/styrene copolymer and 10 g of butyl diglycol acetate was added to the suspension and the whole mixture was milled in a pebble mill (grinding media: glass beads 1,2 and 3 mm in diameter) for 3.5 hours. The product was then filtered, the lacquer was applied to a polyester foil 12μ in thickness and the iron pigment dispersed in the lacquer was orientated in a magnetic field. The magnetic layer was dried. The thickness of the layer when dry was about 6μ.

Results of magnetic measurements on the tape:
$I^{H}c$: 1050 Oe
Br: 2600 G
Br/Bs: 0.72

EXAMPLE 7

5.8 g of the product of reaction of 1 mole tetraethylsilicate with 1 mole 9-octadecen-1-ol obtained after removing the volatile constituents (final pressure, 18 mbar; sump-temperature, up to 175° C.) was emulsified with a mixture of 270 g isopropanol and 180 g distilled water, adjusted with ammonia to pH 6.8. By means of a dissolver, 50 g of a needle-shaped pyrophoric metal pigment consisting substantially of iron ($I^{H}C$: 852 Oe, $Br/\tau$: 1108 $Gg^{-1}cm^3$, $4\pi I_s/\tau$: 1847 $Gg^{-1}cm^3$, $Br/4\pi I_s$: 0,60) was dispersed in this emulsion. The suspension was agitated for 45 minutes at 50° C. and then spray-dried (in a model HO IRA Mini spray-drying apparatus) under inert conditions at a drying-gas temperature of about 200° C. A sample of the powdery product was exposed to air. The magnetic powder data determined from this sample immediately (A) and after 10 days' storage in air in a thin layer at 25° C. and 65% relative humidity (B) are as follows:

| | A | B |
|---|---|---|
| $I^{H}C$ (Oe) | 875 | 912 |

-continued

| | A | B |
|---|---|---|
| Br/ρ ($Gg^{-1}cm^3$) | 938 | 868 |
| $4\pi I_s/\rho$ ($Gg^{-1}cm^3$) | 1662 | 1506 |
| $Br/4\pi I_s$ | 0,56 | 0,58 |

EXAMPLE 8

13 g 2-ethoxyethyloxy-triethoxysilane was emulsified in a mixture of 135 g of ethanol and 315 g of distilled water. 50 g of a needle-shaped pyrophoric iron pigment ($I^HC$: 999 Oe, Br/τ: 1005 $Gg^{-1}cm^3$, $4\pi I_s/\tau$: 1771 $Gg^{-1}cm^3$, $Br/4\pi I_s$: 0,57) was then dispersed in that emulsion. The resultant suspension was agitated for half an hour at room temperature and then fed to a laboratory spray dryer (model HO IRA Mini spray-drying apparatus), its drying-gas, nitrogen, having a temperature between 200° and 220° C. A sample of the spray-dried pigment was exposed to air. Determination of the magnetic powder data immediately (A) and after 10 days' storage in air in a thin layer at 25° C. and 65% relative humidity (B) produced the following result:

| | A | B |
|---|---|---|
| $I^HC$ (Oe) | 993 | 1002 |
| Br/ρ ($Gg^{-1}cm^3$) | 832 | 787 |
| $4\pi I_s/\rho$ ($Gg^{-1}cm^3$) | 1540 | 1438 |
| $Br/4\pi I_s$ | 0,54 | 0,54 |

EXAMPLE 9

75 g of a needle shaped pyrophoric metal pigment consisting substantially of iron ($I^HC$: 845 Oe, Br/τ: 1150 $Gg^{-1}cm^3$, $4\pi I_s/\tau$: 1916 $Gg^{-1}cm^3$$Br/4\pi I_s$: 0,60) was suspended by means of a dissolver in an emulsion of 12.8 g cyclohexyloxy-triethoxysilane in a mixture of 264 g isopropanol and 396 g distilled water. The emulsion had first been adjusted to a pH of 5 by the addition of ammonia water. The metal-pigment suspension was agitated for 30 minutes at 75° C. and then spray-dried under nitrogen. (Model HO IRA Mino spray-drying apparatus; drying temperature about 200° C.) A sample of the cooled product was exposed to air. The magnetic powder data of this sample were determined immediately (A) and after 10 days' storage in air in a thin layer at 25° C. and 65% relative humidity (B). Results:

| | A | B |
|---|---|---|
| $I^HC$ (Oe) | 882 | 917 |
| Br/ρ ($Gg^{-1}cm^3$) | 958 | 934 |
| $4\pi I_s/\rho$ ($Gg^{-1}cm^3$) | 1689 | 1650 |
| $Br/4\pi I_s$ | 0,57 | 0,57 |

EXAMPLE 10

330 g 2-ethylbutyloxy-triethoxysilane was reacted at 70° C. in the presence of an immobilized acid as catalyst with 18 g distilled water, dissolved in 60 g ethanol. The cooled reaction mixture was filtered and at a final pressure of 30 mbar and a temperature of not more than 70° C. freed of low-boiling components. 5 g of the product so obtained was emulsified in a mixture of 88 g methanol and 352 g distilled water. 50 g of a needle-shaped pyrophoric metal pigment consisting substantially of iron ($I^HC$: 714 Oe, Br/τ: 973 $Gg^{-1}cm^3$, $4\pi I_s/\delta$: 1864 $Gg^{-1}cm^3$, $Br/4\pi I_s$: 0,52) was then suspended in that emulsion. The suspension was agitated for 1 hour at room temperature and then spraydried under inert conditions at a drying-gas temperature ranging from 200° to 220° C. (in a model HO IRA Mino spraydrying apparatus). A sample of the particulate material exposed to air was found to have the following magnetic powder data immediately following preparation (A) and after 10 days' storage in air in a thin layer at 25° C. and 65% relative humidity (B):

| | A | B |
|---|---|---|
| $I^HC$ (Oe) | 697 | 736 |
| Br/ρ ($Gg^{-1}cm^3$) | 877 | 827 |
| $4\pi I_s/\rho$ ($Gg^{-1}cm^3$) | 1786 | 1681 |
| $Br/4\pi I_s$ | 0,49 | 0,49 |

EXAMPLE 11

397 g of a mixture of
2.0 wt. % tetraethylsilicate,
53.4 wt. % 2-ethylhexyloxy-triethoxiysilane,
40.3 wt. % bis-(2-ethylhexyloxy)diethoxysilane,
3.7 wt. % tris-(2-ethylhexyloxy)-ethoxysilane and
0.6 wt. % ethanol
was reacted in the presence of an immobilized acid as catalyst at 70° C. with 17 g distilled water, dissolved in 80 g ethanol. The reaction mixture was then cooled, filtered, and freed of low-boiling components at a final pressure of 30 mbar and a temperature of not more than 70° C. 50 g of a needle-shaped pyrophoric metal pigment consisting substantially of iron ($I^HC$: 1094 Oe, Br/τ: 1086 $Gg^{-1}cm^3$, $4\pi I_s/\tau$: 1742 $Gg^{-1}cm^3$, $Br/4\pi I_s$: 0,62) was then dispersed in an emulsion of 6 g of the product so obtained in 440 g of distilled water. The suspension was evaporated to dryness in a rotary evaporator at a final pressure of 30 mbar and temperatures of up to 150° C. and the granular material was cooled under nitrogen. A sample of the cooled product was ground and exposed to air. The magnetic powder data determined from that sample immediately (A) and after 10 days' storage in air in a thin layer at 25° C. and 65% relative humidity (B) were as follows:

| | A | B |
|---|---|---|
| $I^HC$ (Oe) | 1050 | 1096 |
| Br/ρ ($Gg^{-1}cm^3$) | 890 | 874 |
| $4\pi I_s/\rho$ ($Gg^{-1}cm^3$) | 1561 | 1558 |
| $Br/4\pi I_s$ | 0,57 | 0,56 |

It will be understood that the specification and examples are illustrated but not limitative of the present invention and that other embodiments within the spirit and scope of the invention will suggest themselves to those skilled in the art.

We claim:

1. A pigment of a magnetic metal or alloy thereof carrying, in about 0.2 to 30% of the weight of the metal or alloy, a coating of at least one member selected from the group consisting of an ortho-silicic acid ester, a hydrolyzate thereof and a condensation product thereof.

2. A pigment according to claim 1, wherein the coating is present in about 1 to 20% by weight.

3. A pigment according to claim 1, wherein the ortho-silicic acid ester is of the formula $$(RO)_nSi(OR')_{4-n}$$

in which

R is an alkyl, cycloalkyl or alkenyl radical having from 1 to 20 C-atoms, possibly branched and/or interrupted by at least one oxygen bridge, an aryl radical, or an aralkyl radical, R' is an alkyl radical having from 1 to 4 C-atoms, and n is from 0 to 4.

4. A pigment according to claim 1, wherein the coating additionally contains a corrosion inhibitor in about 0.01 to 5% by weight of the metal or alloy.

5. A pigment according to claim 4, wherein the corrosion inhibitor is present in about 0.1 to 4% by weight of the metal or alloy and comprises at least one benzotriazole, benzothiazole, benzimidazole, guanidine, amidine or metal salt of a carboxylic acid.

6. A pigment according to claim 3, wherein the coating is present in about 2 to 15% by weight and additionally contains, in about 0.5 to 3% by weight of the metal or alloy, as a corrosion inhibitor at least one benzotriazole, benzothiazole, benzimidazole, guanidine, amidine or metal salt of a carboxylic acid.

7. A process for producing a pigment according to claim 1, comprising suspending a pigment of a magnetic metal or alloy thereof in a liquid medium containing at least one ortho-silicic acid ester or polysilicic acid ester, separating the pigment from the liquid medium, and drying the pigment at about 50° to 250° C.

8. A process according to claim 7, wherein the liquid medium additionally contains a corrosion inhibitor.

9. A process according to claim 8, wherein drying is effected in an inert gas atmosphere and the dried pigment is thereafter transferred to an oxygen-containing atmosphere.

* * * * *